United States Patent [19]

Nishikawa et al.

[11] 4,258,987
[45] Mar. 31, 1981

[54] PNEUMATIC FILM HOLDING DEVICE

[76] Inventors: Yukio Nishikawa, 157 Aoshiro-cho, Ichijoji, Sakyo-ku, Kyoto-shi; Zenji Oyabu, 38 Saiji-cho, Karahashi, Minami-ku, Kyoto-shi, both of Japan

[21] Appl. No.: 54,678

[22] Filed: Jul. 5, 1979

[30] Foreign Application Priority Data

Aug. 18, 1978 [JP] Japan ............................ 53-113747[U]

[51] Int. Cl.³ .......................... G03B 21/16; G03B 1/48
[52] U.S. Cl. ..................................... 353/95; 352/147; 353/61
[58] Field of Search ............................. 353/95, 96, 61; 352/146, 147

[56] References Cited

U.S. PATENT DOCUMENTS 2,443,171  6/1948  Tuttle .................................. 352/146
3,400,995  9/1968  Borberg et al. ...................... 352/147

Primary Examiner—Steven L. Stephan
Attorney, Agent, or Firm—John Cyril Malloy

[57] ABSTRACT

A device for holding film in a projector is disclosed, in which the film is loosely held between two transparent plates, and air is supplied between one of the transparent plates and the film, so as to clamp the film to the other transparent plate. Thereby the film is gently and positively held, and is also cooled.

5 Claims, 7 Drawing Figures 4,258,987

PNEUMATIC FILM HOLDING DEVICE

BACKGROUND OF THE INVENTION

This invention relates to a device for holding film in a projector, such as a microfilm printer or enlarger, a microfilm reader, a moving film projector, a composer, or the like.

In FIG. 1 is shown a conventional microfilm printer, comprising a light source box 1 which contains a light source 2, a solenoid 3 for actuating a shutter 4, a condenser lens 5, etc.; a film holding device 6 which includes upper and lower glass clamping members 7 and 8 for clamping a microfilm 9, so that the picture on the emulsified surface of the microfilm 9 is held flat for printing; projecting lenses 10 for focusing the picture onto a photosensitive material; and a printing plate support 11 for supporting a printing plate 12. In this printer the light source box 1, the film holding device 6, and the projecting lenses 10 are movable in the transverse and the longitudinal directions with respect to the printing plate 11, in the same manner as an exposure head in a composer.

When film is held in such a film holding device twisting and distortion of the film are effectively avoided, and the film is well flattened, by arranging the plates 7 and 8 quite close together. However, especially if the device is badly adjusted, there is a risk of scratching the film between the plates 7 and 8, because they clamp it fairly strongly.

SUMMARY OF THE INVENTION

Therefore it is an object of the present invention to provide a device for holding a film in a projector which holds the film gently and yet firmly, without great risk of scratching it.

According to the present invention, this object is accomplished by, in a projector which projects an image of a film, a device which holds the film, comprising: a first transparent plate; a second transparent plate parallel to the first transparent plate with a certain spacing therebetween; and a means for supplying air; the film passing loosely between the plates, and the air supply means supplying a stream of air between the first transparent plate and the film, and the pressure of the stream of air holding the film against the second transparent plate.

BRIEF DESCRIPTION OF THE DRAWINGS

In order that the present invention may be better understood, several preferred embodiments will now be described, with reference to the accompanying drawings. However, it should be clearly understood that the description of these embodiments, and the drawings, are given for the purposes of explanation and elucidation only, and are not intended to be in any way limitative of the present invention, whose scope it is intended to define solely by the appended claims. In the drawings:

DESCRIPTION OF THE PREFERRED EMBODIMENTS

Figure 1:
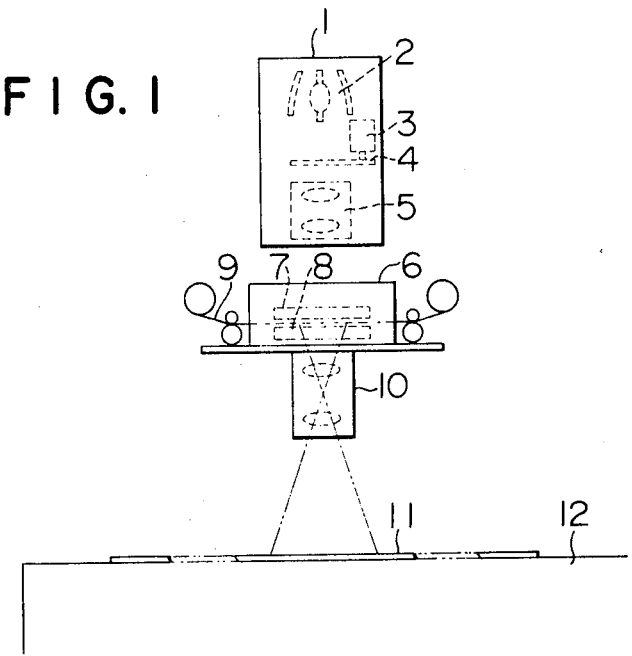
FIG. 1 is an elevational view of a conventional microfilm apparatus.

In the different figures of the drawings, like reference numerals denote like parts, and hence some of the descriptions thereof will be omitted.

Figure 2:
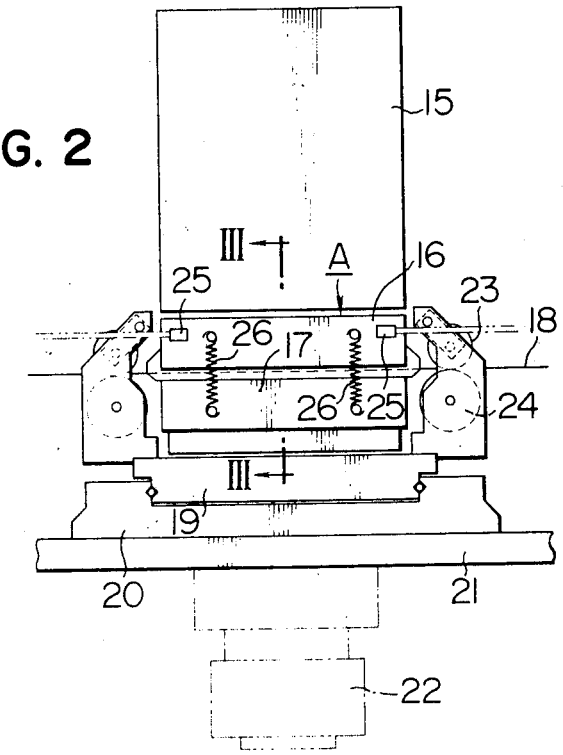
FIG. 2 is an elevational view of an exposure head of a microfilm printer, which incorporates a film holding device which is an embodiment of the present invention.

In FIG. 2 is shown an exposure head comprising a light source box 15, which is movable up and down, and is mounted to a frame which is not shown; a film holding device A according to the present invention, which is also mounted independently to the frame; and so on. The film holding device A comprises upper and lower clamp members 16 and 17 which hold a microfilm 18 placed between them. The position of the film 18 is adjusted in the X and Y directions by movable tables 19 and 20, and these tables are mounted on a turntable 21 which is rotated so as to change the angle of the film. A projection lens 22 is provided for projecting an image of the film 18. Pairs of nip rollers 23 and 24 are provided so as to move the film 18. According to the present invention, a pair of air conduits 25 are provided in the upper clamp member 16, and these are fed with compressed air from an air source which is not shown, via an air control system which is not shown either.

Figure 3:
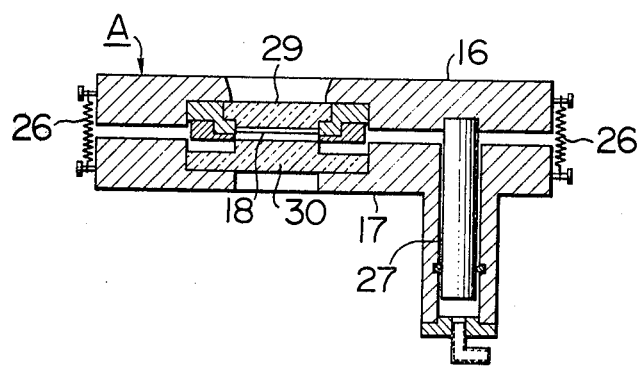
FIG. 3 is a longitudinal cross-section of the film holding device, taken along the line III—III in FIG. 1.

As is shown in FIG. 3, the upper clamp member 16 and the lower clamp member 17 may be separated by pushing the upper clamp member 16 upwards by supply of air to an air cylinder 27. The clamp members 16 and 17 are biased together by springs 26.

Figure 4:
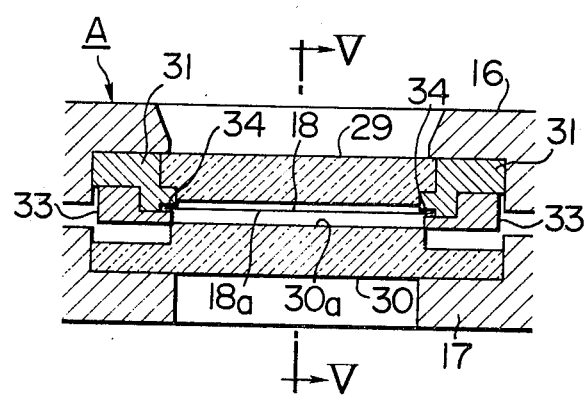
FIG. 4 is an enlargement of part of FIG. 3.
Figure 5:
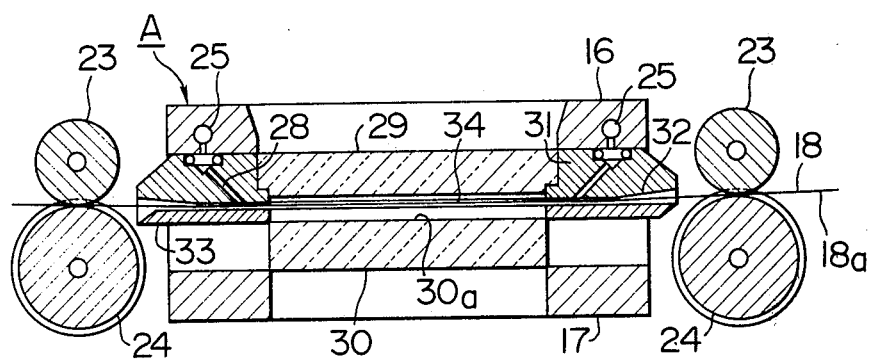
FIG. 5 is a section taken along the line V—V in FIG. 4.
Figure 6:
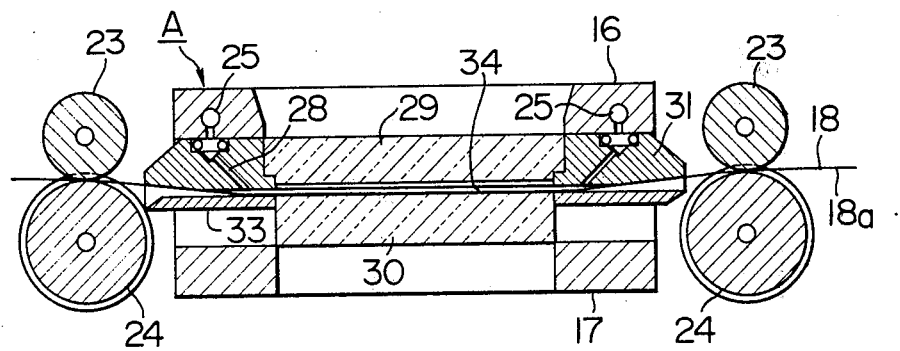
FIG. 6 is a view similar to FIG. 5, showing the film being held by the supply of air.

The upper clamp member may be better seen in FIGS. 4, 5, and 6. It is formed with an upper transparent plate 29 made of quartz glass, and this plate is held in an upper block member 31 which has sloping lower surfaces 32, inclining upwards at its edges, as may be seen in FIGS. 5 and 6. Under this upper block member 31 is a lower block member 33 for guiding the film. As can be best seen in FIG. 4, between the upper and lower block members 31 and 33 are formed two grooves 34 which guide the edges of the film, and which extend along the longitudinal direction of the film. The lower clamp member 17 is formed with a lower transparent plate 30, also made of quartz glass.

Through the upper block member 31 are formed two air conduits 28, which lead to the air pipes 25. These air conduits 28 are so arranged as to direct air to the space between the film and the upper transparent plate 29.

In use, first the film is fed between the two trasparent plates, as shown in FIG. 5, with the air cylinder 27 activated so as to hold the plates apart. The air cylinder 27 is de-activated, and the plates move together. Air is then supplied to the pipes 25, and this air blows out of the conduits 28 between the upper transparent plate 29 and the film 18. Thereby, as seen in FIG. 6, the film is gently yet positively held against the lower transparent plate 30, being held by this plate 30, the two grooves 34, and by its contact with the lower surfaces of the upper block member 31. As will be seen, in this position, there is a certain gap between the top surface of the film, which may be, in this embodiment, the non-emulsified surface, and the upper transparent plate 29.

The air blown into the space between the film 18 and the upper plate 29 escapes through the grooves 34 and the gap between the film and the inclined surfaces 32.

Figure 7:
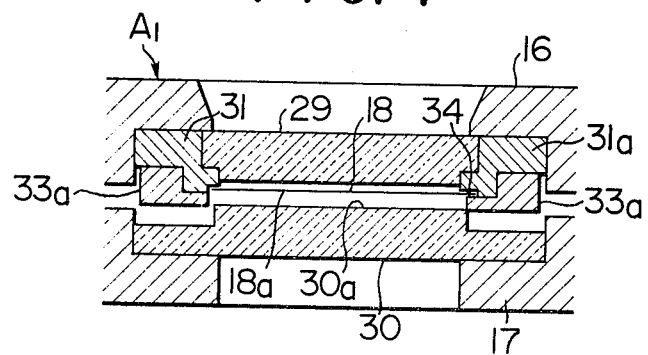
FIG. 7 is a view similar to FIG. 4, showing another embodiment of the present invention.

FIG. 7 shows another embodiment of the present invention, which is the same as that described above, except that there is only one groove 34 provided between the upper and lower block members 31*a* and 33*a*. In certain circumstances this embodiment may operate more smoothly than the previous embodiment.

A particular advantage of the present invention is that the flow of air, as well as holding the film positively and yet gently to the lower transparent plate, has a function of cooling the film also.

Although the present invention has been shown and described with reference to several preferred embodiments thereof, it should be understood that various changes and modifications to the details of any particular embodiment may be made by a person of ordinary skill in the art, without departing from the scope of the invention. Therefore it is desired that the limits of protection afforded to this invention by Letters Patent should be defined, not by any of the purely fortuitous details of the illustrated embodiments, but solely by the accompanying claims, which follow.

What is claimed is:

1. For use in a projector means to project an image of a film,
    a film holding device to hold the film flat and avoid twist and distortion of the film in a projection space and to reduce the risk of film scratches,
    said device comprising,
    a first transparent plate having a planar surface, and a second transparent plate having a planar surface parallel to and in confronting relation to said planar surface of said first transparent plate,
    an upper clamp member,
    said upper clamp member including means to hold said planar surface of said first plate a predetermined distance from said planar surface of said second plate defining a relatively thin film passage space between the planar surfaces,
    said upper clamp member having a longitudinally extending recess defining film guide means for longitudinal movement of film in spanning relation of said projection space and between said planar surfaces,
    said recess being enlarged defining an entrance mouth into said space and said entrance mouth diverging from said planar surface of said lower transparent plate,
    said upper clamp member including a duct network with outlet means opening into said space and facing said planar surface of said second transparent plate, and
    means for supplying air into said duct system and from said outlet means into said film passage space to gently hold the film against the planar surface of said second transparent plate.

2. The device as set forth in claim 1 wherein said device includes a second clamp member to hold said second transparent plate.

3. The device as set forth in claim 2 wherein said second clamp member includes a recessed shoulder confronting said upper clamp member and said upper clamp member being sized for telescopic movement of said upper clamp member relative to said second clamp member.

4. The device as set forth in claim 1 wherein film feed means comprising nip rollers and provided for movement of the film through said film passage space.

5. The device as set forth in claim 1 wherein said device includes means for movement of adjustment of translation and rotation of said planar surfaces.

* * * * *

UNITED STATES PATENT OFFICE
CERTIFICATE OF CORRECTION

Patent No. 4,258,987     Dated March 31, 1981

Inventor(s) Yukio Nishikawa and Zenji Oyabu

It is certified that error appears in the above-identified patent and that said Letters Patent are hereby corrected as shown below:

On the title page add Item [73]: --Assignee: Dainippon Screen Seizo Kabushiki Kaisha, Kyoto-Shi, Japan--.

Signed and Sealed this

Seventeenth Day of November 1981

[SEAL]

Attest:

Attesting Officer

GERALD J. MOSSINGHOFF

Commissioner of Patents and Trademarks